(12) United States Patent
Sun et al.

(10) Patent No.: US 8,417,190 B2
(45) Date of Patent: Apr. 9, 2013

(54) UPLINK FEEDBACK CHANNEL REPORTING MECHANISM IN WIRELESS SYSTEMS

(75) Inventors: Hongmei Sun, Beijing (CN); Guangjie Li, Beijing (CN); Rath Vannithamby, Portland, OR (US); Jeong Lee, Portland, OR (US); Yuan Zhu, Beijing (CN); Feng Zhou, Beijing (CN); Jong-Kae Fwu, Sunnyvale, CA (US); Hujun Yin, Saratoga, CA (US); Kuilin Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 12/646,962

(22) Filed: Dec. 23, 2009

(65) Prior Publication Data

US 2010/0273435 A1 Oct. 28, 2010

Related U.S. Application Data

(60) Provisional application No. 61/173,204, filed on Apr. 28, 2009.

(51) Int. Cl.
*H04B 17/00* (2006.01)

(52) U.S. Cl. ............ 455/67.13; 455/130; 455/466; 455/423; 455/509; 455/67.14; 370/252; 370/329; 370/328; 370/278; 370/430

(58) Field of Classification Search ............ 455/67.13, 455/466, 423, 509, 67.14, 130; 370/252, 370/329, 328, 278, 430

See application file for complete search history.

(56) References Cited

U.S. PATENT DOCUMENTS

| | | | | |
|---|---|---|---|---|
| 7,864,746 | B2 * | 1/2011 | Ihm et al. | 370/349 |
| 7,885,211 | B2 * | 2/2011 | Shen et al. | 370/278 |
| 7,978,623 | B1 * | 7/2011 | Kotecha | 370/252 |
| 8,000,258 | B2 * | 8/2011 | Ko et al. | 370/252 |
| 8,045,508 | B2 * | 10/2011 | Lee et al. | 370/328 |
| 8,159,978 | B2 * | 4/2012 | Chun et al. | 370/278 |
| 8,165,075 | B2 * | 4/2012 | Han et al. | 370/329 |
| 8,184,544 | B2 * | 5/2012 | Ko et al. | 370/249 |
| 8,200,165 | B2 * | 6/2012 | Sun et al. | 455/69 |
| 8,295,193 | B2 * | 10/2012 | Ko et al. | 370/252 |
| 8,305,952 | B2 * | 11/2012 | Youn et al. | 370/315 |
| 2006/0111129 | A1 * | 5/2006 | Ihm et al. | 455/466 |
| 2007/0217361 | A1 | 9/2007 | Vannithamby et al. | |
| 2008/0130612 | A1 | 6/2008 | Gorokhov et al. | |

(Continued)

FOREIGN PATENT DOCUMENTS

WO 2010/129356 A2 11/2010

OTHER PUBLICATIONS

International Preliminary Report on Patentability for International Patent Application No. PCT/2010/032821, mailed on Nov. 10, 2011, 5 pages.

(Continued)

*Primary Examiner* — Temesgh Ghebretinsae
*Assistant Examiner* — Md Talukder
(74) *Attorney, Agent, or Firm* — Carrie A. Boone, P.C.

(57) ABSTRACT

An uplink feedback channel reporting method is disclosed for using the primary and secondary fast feedback channels to efficiently report the channel quality, MIMO feedback, and CQI types of data from a mobile station to a base station. The reporting method reports regular information periodically and non-regular information on demand.

20 Claims, 12 Drawing Sheets

U.S. PATENT DOCUMENTS

| | | | |
|---|---|---|---|
| 2008/0170523 A1* | 7/2008 | Han et al. | 370/310 |
| 2008/0225792 A1* | 9/2008 | Naguib et al. | 370/330 |
| 2008/0305745 A1* | 12/2008 | Zhang et al. | 455/67.11 |
| 2009/0059844 A1* | 3/2009 | Ko et al. | 370/328 |
| 2009/0190528 A1* | 7/2009 | Chung et al. | 370/328 |
| 2010/0002664 A1* | 1/2010 | Pan et al. | 370/338 |
| 2010/0027447 A1* | 2/2010 | Choi et al. | 370/280 |
| 2010/0035644 A1* | 2/2010 | Wu et al. | 455/517 |
| 2010/0118817 A1* | 5/2010 | Damnjanovic et al. | 370/329 |
| 2010/0195614 A1* | 8/2010 | Nimbalker et al. | 370/330 |
| 2010/0232374 A1* | 9/2010 | Ofuji et al. | 370/329 |
| 2010/0233968 A1* | 9/2010 | Roh et al. | 455/67.13 |
| 2010/0272033 A1* | 10/2010 | Fwu et al. | 370/329 |
| 2010/0272042 A1* | 10/2010 | Chun et al. | 370/329 |
| 2011/0105171 A1* | 5/2011 | Luschi et al. | 455/513 |
| 2011/0141926 A1* | 6/2011 | Damnjanovic et al. | 370/252 |
| 2011/0149903 A1* | 6/2011 | Krishnamurthy et al. | 370/330 |
| 2011/0200127 A1* | 8/2011 | Lee et al. | 375/260 |
| 2011/0261774 A1* | 10/2011 | Lunttila et al. | 370/329 |
| 2012/0003945 A1* | 1/2012 | Liu et al. | 455/115.1 |
| 2012/0106500 A1* | 5/2012 | Chun et al. | 370/329 |
| 2012/0113861 A1* | 5/2012 | Chun et al. | 370/252 |
| 2012/0201207 A1* | 8/2012 | Liu et al. | 370/329 |

OTHER PUBLICATIONS

International Search Report and Written Opinion for PCT Application No. PCT/US2010/032821, mailed on Nov. 18, 2010, 9 Pages.

* cited by examiner

Figure 2
primary fast feedback channel 20 (PFBCH)
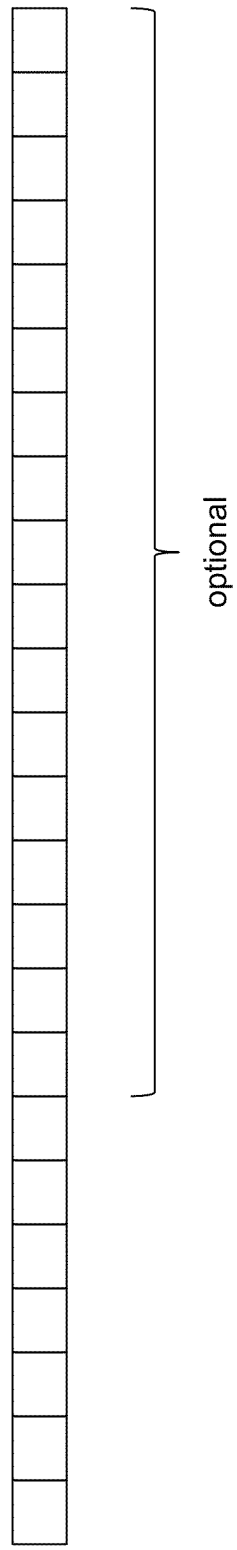
secondary fast feedback channel 30 (SFBCH)
optional

Figure 4

| index | content (value) | description/notes |
|---|---|---|
| 0 | MCS, rank | 1. total number of combinations of CQI and RI is N |
| 1 | MCS, rank | 2. all combinations are arranged in increasing order of spectral efficiency |
| ... | ... | 3. the first sixteen sequences are reserved for CQI with rank = 1 |
| N | MCS, rank | |

| frame # | n | n+1 | n+2 | n+3 | n+4 | n+5 | n+6 | n+7 |
|---|---|---|---|---|---|---|---|---|
| FBCH for CQI/PMI reporting | CQI | RI | CQI | CQI | CQI | RI | CQI | CQI |

Interlaced CQI and rank reporting in FBCH

| PFBCH content | description | notes |
|---|---|---|
| wideband CQI | one average CQI across the whole band for both CL & OL MIMO working in downlink diversity mode | regular information to be reported periodically |
| average CQI | one average CQI across the selected multiple sub-bands | |
| specified CQI | CQI specified for a certain resource unit indicated by parameter in downlink signaling | |
| rank indicator | number of streams for all single-user MIMO schemes | |
| event-driven indicator (EDI) | mobile station to indicate channel variation event | non-regular information to be reported on demand |
| bandwidth request indicator | this is used to request uplink bandwidth | |
| frequency partition selection (FPS) | inform base station the frequency partition of the reported CQI (downlink diversity mode only) | |
| buffer management | indicates occupancy status of HARQ soft buffer | |

Figure 8

| sequence index | content (value) | description/notes |
|---|---|---|
| 0 | MCS, rank | 1. total # of combinations of CQI & RI is N<br>2. all combinations are arranged in increasing order of spectral efficiency<br>3. 1st sixteen sequences reserved for CQI w/rank = 1 |
| 1 | MCS, rank | |
| ... | ... | |
| N | MCS, rank | |
| N + 1 | (reserved) | |
| ... | (reserved) | |
| 52 | (reserved) | |
| 53 | preferred MIMO mode | mobile station indicates preferred MIMO mode |
| 54 | preferred MIMO mode | |
| 55 | indicates 80% occupancy of HARQ soft buffer | mobile station-assisted buffer management to inform base station the occupancy of mobile station HARQ soft buffer level |
| 56 | indicates HARQ soft buffer oveflow | |
| 57 | bandwidth request indicator | used to request uplink bandwidth |

Figure 8 (cont.)

| sequence index | content (value) | description/notes |
|---|---|---|
| 58 | frequency partition 1 (reuse-1) | mobile station informs base station the frequency partition of the reported CQI (for downlink diversity mode) |
| 59 | frequency partition 2 (reuse-3) | |
| 60 | frequency partition 3 (reuse-3) | frequency partition indexing definition given below |
| 61 | frequency partition 4 (reuse-3) | |
| 62 | request to switch reporting in SFBCH from event-driven mode to regular mode | 1. mobile station sends request based on channel variaton event<br>2. base station will reallocate its SFBCH and MS resumes periodic CQI/MIMO feedback reporting (regular mode) |
| 63 | request to switch reporting in SFBCH from regular mode to event-driven mode | 1. mobile station sends request based on channel variation event<br>2. base station will release SFBCH allocation and MS will stop reporting in SFBCH (event-driven mode) |

Figure 9

| SFBCH content | description | notes |
|---|---|---|
| sub-band CQI | reporting of average and differential CQI of selected sub-bands | short-term |
| sub-band selection | selected sub-band position, index or bitmap to indicate sub-band selection | long-term |
| sub-band PMI | pre-coding matrix indicator of one sub-band for CL MIMO | short-term |
| stream indicator | needed for OL multi-user MIMO only and used to indicate which spatial stream to estimate CQI | long-term |
| rank indicator | number of streams | long-term |

Figure 10A first SFBCH feedback format

| table 32 | table 32 | table 32 | table 32 | table 32 |
|---|---|---|---|---|
| frame 0 | frame 1 | frame 2 | frame 3 | frame 4 |

Figure 10B second SFBCH feedback format

| sub-band selection | CQI + PMI | CQI + PMI | CQI + PMI | sub-band selection |
|---|---|---|---|---|
| frame 0 | frame 1 | frame 2 | frame 3 | frame 4 |

Figure 10C third SFBCH feedback format

| subband selection + ave_CQI | type 1 diff CQI + PMI | type 2 diff CQI + PMI | type 2 diff CQI + PMI | subband selection + ave_CQI |
|---|---|---|---|---|
| frame 0 | frame 1 | frame 2 | frame 3 | frame 4 |

Figure 10D fourth SFBCH feedback format

| subband selection + SI | type 1 diff CQI + PMI | type 2 diff CQI + PMI | type 2 diff CQI + PMI | subband selection + SI |
|---|---|---|---|---|
| frame 0 | frame 1 | frame 2 | frame 3 | frame 4 |

UPLINK FEEDBACK CHANNEL REPORTING MECHANISM IN WIRELESS SYSTEMS

CROSS-REFERENCE TO RELATED APPLICATIONS

This application claims priority under 35 U.S.C. 119(e) to U.S. Provisional Patent Application Ser. No. 61/173,204, entitled, "ADVANCED WIRELESS COMMUNICATION SYSTEMS AND TECHNIQUES", filed on Apr. 28, 2009.

TECHNICAL FIELD

This application relates to the primary and secondary fast feedback channel support under the advanced air interface standard.

BACKGROUND

IEEE 802.16 is a set of wireless broadband standards promulgated by the Institute of Electrical and Electronics Engineers (IEEE). IEEE 802.16m is known as the advanced air interface standard. Under this standard, there are two types of uplink fast feedback channels: a primary fast feedback channel (PFBCH), supporting up to six bits of information; and a secondary fast feedback channel (SFBCH), supporting up to twenty-four bits of information. Thus, the SFBCH has up to three times as much storage as the PFBCH. The availability of either the PFBCH, the SFBCH, or both fast feedback channels, will vary, depending on a number of criteria.

With this new standard, there is a need to define a method for efficiently using the PFBCH and SFBCH channels for reporting the channel quality, multiple-input-multiple-output (MIMO) feedback and channel quality indicator (CQI) types of data.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 2 is a block diagram of the primary and secondary fast feedback channels used by the uplink feedback channel reporting method of FIG. 1, according to some embodiments;

FIG. 4 is a table showing the joint-coded reporting performed by the uplink feedback channel reporting method of FIG. 1, according to some embodiments;

FIG. 5 is a block diagram showing interlaced channel quality and rank indicator reporting by the uplink feedback channel reporting method of FIG. 1, according to some embodiments;

FIG. 7 is a table showing the feedback content in the primary fast feedback channel used by the uplink feedback reporting method of FIG. 1, according to some embodiments;

FIG. 8 is a table showing the mapping of CQI and rank combinations, as well as non-regular information to the primary fast feedback channel by the uplink feedback reporting method of FIG. 1, according to some embodiments;

FIG. 9 is a table showing use of the secondary fast feedback channel by the uplink feedback reporting method of FIG. 1, according to some embodiments; and FIGS. 10A-10D are block diagrams showing short- and long-term information reporting using time division multiplexing by the uplink feedback channel reporting method of FIG. 1, according to some embodiments.

DETAILED DESCRIPTION

In accordance with the embodiments described herein, an uplink feedback channel reporting method is disclosed for using the primary and secondary fast feedback channels to efficiently report the channel quality, MIMO feedback, and CQI types of data from a mobile station to a base station. In some cases, the method may use the bandwidth request channel as well for such reporting.

Figure 1:
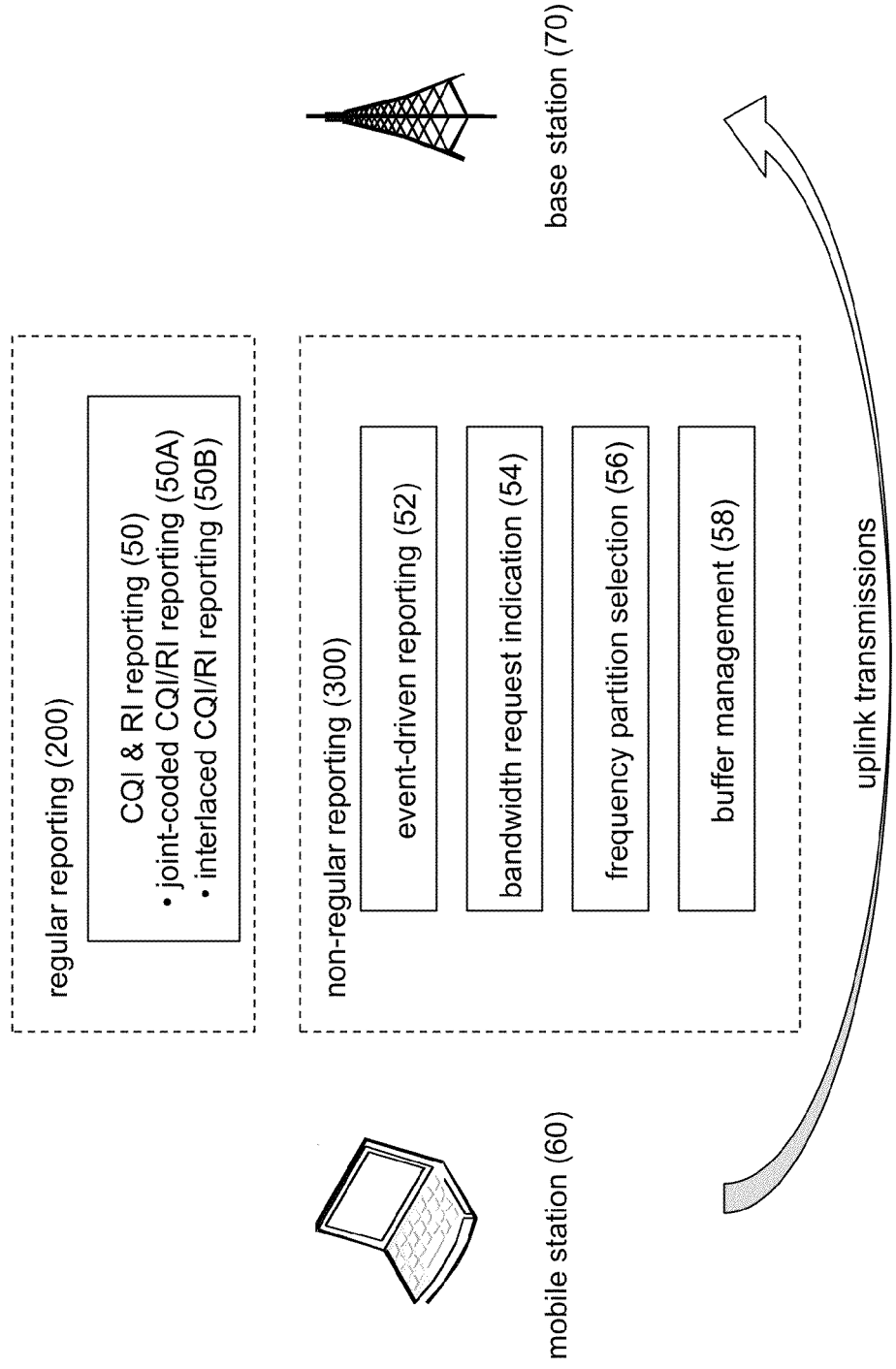
FIG. 1 is a schematic diagram showing the uplink feedback channel reporting method being employed in a wireless network, according to some embodiments.

FIG. 1 is a schematic drawing of an uplink feedback channel reporting (UFCR) method 100, according to some embodiments. The UFCR method 100 is a flexible scheme that employs the PFBCH 20, the SFBCH 30, or both feedback channels, to report CQI information, MIMO feedback, and CQI types of data.

The UFCR method 100 performs a variety of uplink tasks, where uplink transmissions are those coming from a mobile station 60 to a base station 70. In FIG. 1, the mobile station 60 is depicted as a laptop computer, but the mobile station may be a wireless cell phone, a personal digital assistant, or other mobile technology for communicating with the base station 70. The base station 70 may service multiple mobile stations (not shown) simultaneously. Optionally, the UFCR method 100 may employ a bandwidth request channel as well as the PFBCH and SFBCH for reporting information to the base station 70.

The operations performed by the UFCR method 100 are separated into regular reporting 200 and non-regular reporting 300. The regular reporting 200 consists of channel quality and rank indicator reporting 50. The regular reporting 200 includes CQI reporting, such as wideband CQI reporting, average CQI reporting, and specified CQI reporting, and rank indicator reporting 50. The non-regular reporting 300 includes event-driven reporting 52, bandwidth request indication 54, frequency partition selection 56, and buffer management 58. In some embodiments, the regular information 200 is reported periodically while the non-regular information 300 is reported on demand. The functions of the UFCR method 100 are described in the following paragraphs.

FIG. 2 is a simple block diagram showing the channels used by the UFCR method 100, according to some embodiments. A primary fast feedback channel (PFBCH) 20 has six bits for storing information. A secondary fast feedback channel (SFBCH) 30 features up to twenty-four bits for storing information, with seven bits being its minimum size. As is described in the following paragraphs, these channels are used by the mobile station 60 to report relevant information about the channel to the base station 70.

CQI and RI Reporting 50

Figure 3:
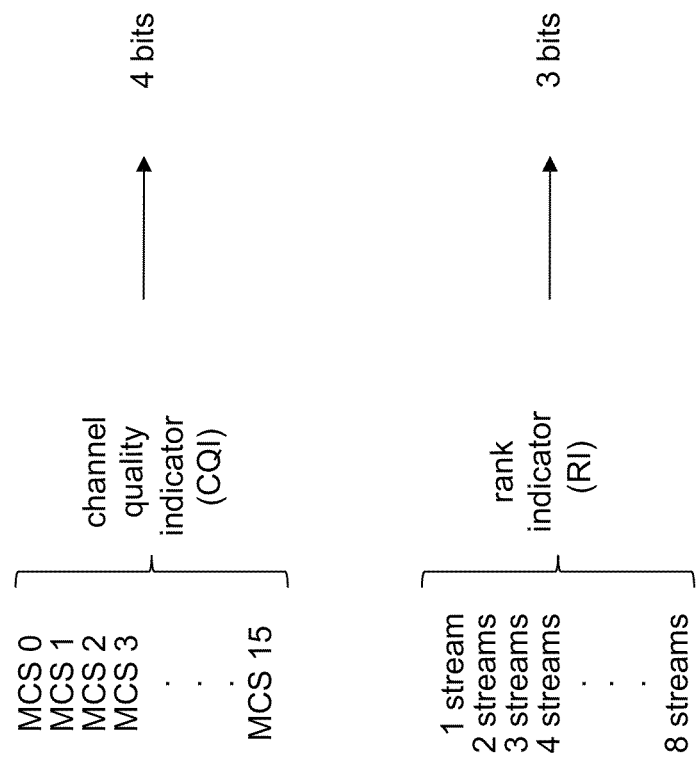
FIG. 3 is a diagram showing the number of bits needed to report channel quality and rank indicators for the typical configuration by the uplink feedback channel reporting method of FIG. 1, according to some embodiments.

For efficient support of downlink adaptation, several modulation and coding scheme (MCS) levels are needed to represent the CQI of a sub-channel efficiently. In some cases, sixteen MCS levels are sufficient for this purpose, so reporting the CQI to the base station using MCS would take four bits. Additionally, up to eight multiple-input-multiple-output (MIMO) streams are supported under the advanced air interface standard (also known herein as 802.16m). The rank indicator conveys the number of streams being used for the MIMO transmissions. To support eight MIMO streams, reporting the RI would take three bits. FIG. 3 is a diagram representing the CQI and RI reporting requirements for the typical case under 802.16m. Reporting both the CQI 40 and the RI 50 would thus take seven bits in all under the typical scenario.

The primary fast feedback channel (PFBCH) 20, however, has only six bits. Thus, a single PFBCH 20 is insufficient for the simultaneous reporting of both the CQI and the RI for the typical case.

The UFCR method 100 uses one of two techniques to reduce the feedback overhead of CQI and RI reporting: joint-coded reporting 50A and interlaced reporting 50B. Both of these techniques enable the CQI 40 and the RI 50 information to be reported using the 6-bit PFBCH. These techniques are described below.

Joint-Coded CQI and RI Reporting 50A

As mentioned above, to report CQI and RI together, seven bits are needed, allowing for 128 combinations ($2^7$). However, the UFCR method 100 filters out unnecessary combinations of CQI and RI by applying certain rules. In some embodiments, the number of allowable combinations, N, is kept between 32 and 64, or within six bits. Thus, where there were originally 128 combinations of CQI and RI, there will be 64 or fewer, or at least half the original number. N may vary, depending on practical considerations. As shown in a table 24 in FIG. 4, N combinations specifying the spectrum efficiency and mapping to different code words are listed.

In some embodiments, the UFCR method 100 uses at least the following two rules for eliminating unlikely possibilities from the 128 combinations. First, the UFCR method 100 avoids using repetition coding when the rank is larger than one. Second, the UFCR method 100 removes most combinations having the same spectrum efficiency. For combinations having the same spectrum efficiency, the UFCR method 100 either keeps the combination that uses a lower MCS with a higher rank, or keeps the higher MCS having a lower rank.

Interlaced CQI and RI Reporting 50B

In contrast to the joint-coded CQI and RI reporting 50A, the CQI and RI may be fed back separately in the same feedback channel, at different times, using time division multiplexing (TDM). FIG. 5 is a diagram showing interlaced CQI and RI reporting 50B in the fast feedback channel, according to some embodiments. Either fast feedback channel (FBCH) is used to report both CQI and pre-coder matrix index (PMI) information to the base station 70 by the mobile station 60.

In some embodiments, the uplink feedback channel reporting method 100 reports the CQI every frame, with the RI reporting "puncturing" the CQI reporting occasionally. Generally, the CQI does not need to be reported in every frame, so the occasional puncturing of the RI information does not compromise the CQI reporting. In the $n^{th}$ frame, the channel quality index is stored in the FBCH. In the $(n+1)^{th}$ frame, the rank index is stored in the FBCH by puncturing the CQI reporting. In the $(n+2)^{th}$, $(n+3)^{th}$, and $(n+4)^{th}$ frames, the CQI is stored in the FBCH. In the $(n+5)^{th}$ frame, the rank index is stored, again by puncturing the CQI reporting.

In this manner, the rank index reporting may puncture the original periodic channel quality index reporting and the RI may be fed back less frequently than the CQI, depending on the scenario. This example shows original CQI reporting in every frame, but the mechanism is not limited to every frame reporting, but operates for any periodic reporting. Interlaced CQI and RI reporting 50B also works where the CQI is reported in every two, three, or more frames, or even when reporting at the sub-frame level occurs.

Event-Driven Reporting 52

Figure 6:
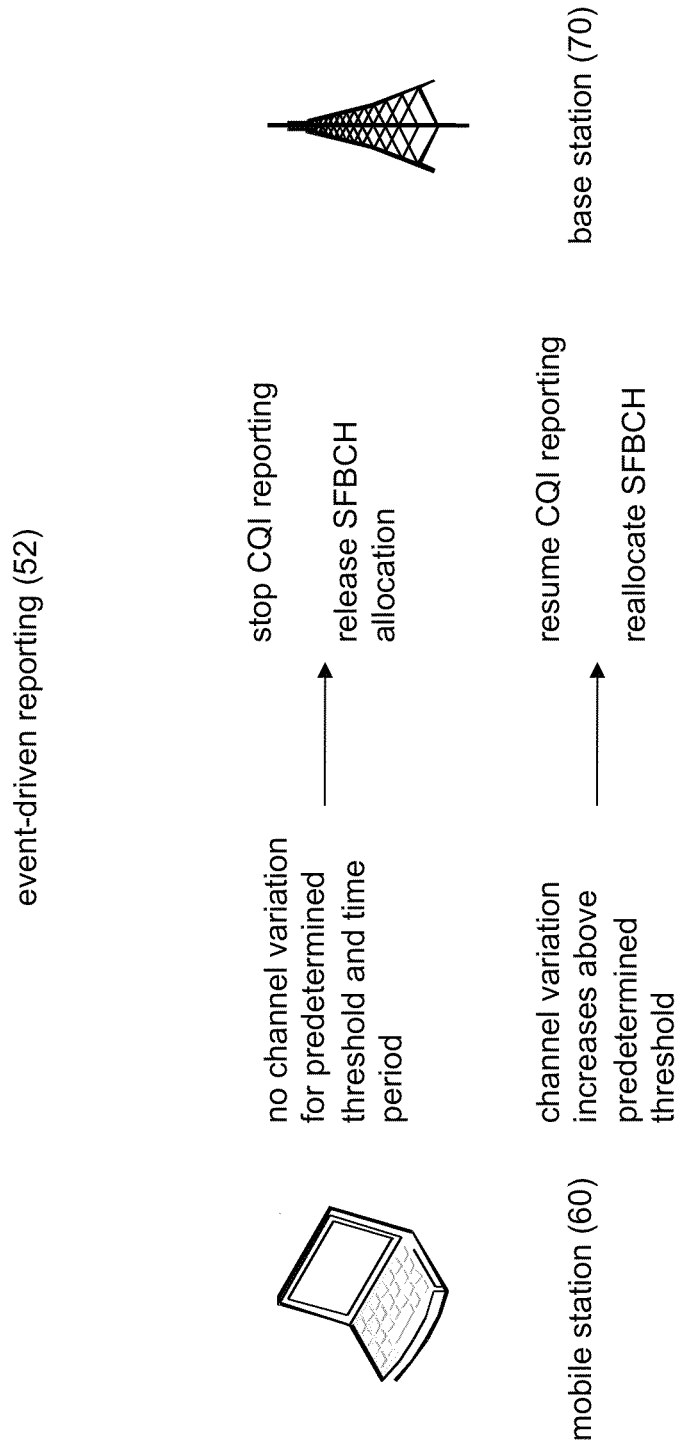
FIG. 6 is a schematic diagram showing event-driven reporting by the uplink feedback channel reporting method of FIG. 1, according to some embodiments.

Returning to FIG. 1, the UFCR method 100 also performs event-driven reporting 52. The reporting of CQI and MIMO information is event-driven, in some embodiments, based on a variation in the channel/traffic. In essence, the mobile station 60 sends start and stop notifications, based on channel variation, to the base station 70. If the mobile station 60 finds that the channel does not vary higher than a predetermined threshold for a certain time period, the mobile station sends a notification to the base station 70, requesting that the base station stop reporting and release its SFBCH allocation. Once the channel variation increases above the predetermined threshold, the mobile station sends another notification to the base station, requesting that the SFBCH allocation and CQI reporting on the channel resume. These operations are depicted schematically in FIG. 6, according to some embodiments.

Event-driven reporting 52 due to traffic variation may also be triggered by the base station 70. To support event-driven reporting 52 in the secondary feedback channel, two kinds of states are reported, in some embodiments. One state is defined to request re-allocation of the secondary feedback channel while the other state is defined to request its release. There are several ways in which the UFCR method 100 transmits this two-state event-driven notification.

One way is to always use the PFBCH 20 to transmit the notification, either by using one bit or by reserving two code words (or sequences). In the one-bit scenario, two states will be reported, one to request reallocation of the secondary feedback channel and the other to request its release (e.g., 0→reallocate SFBCH; 1→release SFBCH).

As another option, the UFCR method 100 may use a bandwidth request channel (BRCH) to transmit the event-driven notification. Where the BRCH is used, a single bit is used to convey either reallocation or release of the secondary fast feedback channel 30 (e.g., 0→reallocate SFBCH; 1→release SFBCH). If the primary fast feedback channel 20 is not on, the secondary fast feedback channel 30 may also be used to request its own de-allocation.

Feedback Content and Reporting Mechanism of PFBCH

Feedback Content in PFBCH

The primary fast feedback channel 20 is designed for robust transmission, carrying up to six information bits. Thus, the PFBCH 20 is efficient for feeding back wideband channel quality, MIMO information, and other CQI-related information. In FIG. 7, a table 26 shows the feedback content in the PFBCH 20 by the UFCR method 100, according to some embodiments, to support frequency selective scheduling (FSS), fractional frequency reuse (FFR), and multiple-input-multiple-output (MIMO) schemes.

The table 26 shows that the PFBCH 20 is used to report both regular information and non-regular information to the base station 70 by the mobile station 60. Regular information, such as wideband CQI, average CQI, specified CQI, and RI, are reported periodically. The wideband CQI consists of an average CQI across the entire band for both closed loop (CL) and open loop (OL) MIMO working in downlink diversity mode. The average CQI consists a single average CQI measure across selected multiple sub-bands. The specified CQI consists of the CQI measure specified for a certain resource unit, indicated by a parameter in downlink signaling. The rank indicator is the number of streams for all single-user MIMO schemes.

In some embodiments, the non-regular information is reported on demand. Non-regular information includes the aforementioned event-driven indicator, a bandwidth request indicator, frequency partition selection (FPS), and buffer management. The event-driven indicator is sent by the mobile station 60 to indicate that the channel has varied beyond a predetermined threshold, or that no channel variation above the threshold has occurred for a predetermined time period. The bandwidth request indicator 54 is used to request an increase or decrease in uplink bandwidth. The frequency partition selection 56 is sent by the mobile station 60 to inform the base station 70 of the frequency partition of the reported CQI (downlink diversity mode only). The buffer management indicator 58 is sent by the mobile station 60 to indicate the occupancy status of the HARQ soft buffer to the base station 70.

Whether to use the PFBCH 20 to report narrowband CQI and narrowband MIMO feedback data depends on the coverage requirement of the MIMO schemes. If one specific MIMO scheme needs 95% coverage, then the PFBCH 20 may be used to transmit narrowband CQI and MIMO feedback for users with poor uplink channel quality, in some embodiments. Otherwise, the UFCR method 100 uses the SFBCH 30 to transmit this information, which saves uplink overhead.

Reporting Mechanism in PFBCH

The primary fast feedback channel 20 is semi-statically allocated to the mobile station 60 by a feedback allocation assignment map (A-MAP) information element (IE) to send periodic CQI and RI feedback according to a pre-configured reporting frequency and non-regular information on demand. In some embodiments, the UFCR method 100 only allocates one PFBCH 20 for each mobile station 60, to reduce overhead. If multiple reports in the PFBCH 20 are needed, the UFCR method 100 uses time division multiplexing to improve coverage.

Different contents are distinguished by sequence in the PFBCH 20. The mapping of a six-bit payload to these contents is described in a table 28 of FIG. 8, according to some embodiments. The first N entries in the table are identical to the table 24 in FIG. 4. Entries with a rank of one are arranged in the beginning, so that the CQI reporting for downlink diversity mode may reuse the same table. The last ten entries indicate the reporting information described above, with two code words (53, 54) indicating the preferred MIMO mode, two code words (55, 56) indicating HARQ soft buffer information, one bit (57) being the bandwidth request indicator, four code words (58-61) indicating frequency partition/reuse information, and the last two code words (62, 63) indicating event-driven requests. Thus, both regular information (CQI and RI reporting) and non-regular information are mapped in a table 28 of FIG. 8, according to some embodiments.

If both wideband CQI and non-regular information, such as an event-driven indicator (EDI) 52, bandwidth request indicator 54, frequency partition selection (FPS) 56, and buffer management 58, are to be sent on demand in the same PFBCH, the non-regular information reporting supercedes the CQI and RI reporting.

If joint-coded CQI and RI reporting is applied in the PFBCH 20, then its information bit length may be fixed to six bits, but the base station 70 will limit the sequence searching range, depending on the total number of streams, to improve performance.

If the channel quality and rank indicators are separately transmitted in the PFBCH 20, the length of the information bits may be variable, depending on whether the CQI or RI are reported, and performance may be improved when fewer information bits are transmitted. In this case, there are different ways to report non-regular information, as mentioned above. In some embodiments, the UFCR method 100 uses a single bit, coupled with CQI reporting, to indicate that the CQI reporting is superceded by non-regular reporting. Also non-regular information reporting may be distinguished by sequences. Or, non-regular information may be coupled with either the CQI or the RI information, or both, when reporting.

For example, the two-bit frequency partition selection may be reported by coupling it with either the four-bit CQI reporting, the one-bit event-driven notification, and/or the one-bit buffer management. One-bit preferred MIMO feedback may be reported by coupling together with three-bit rank index reporting.

Feedback Content and Reporting Mechanism for SFBCH
Feedback Content in SFBCH

The uplink SFBCH 30 carries narrowband CQI and MIMO feedback information. The number of information bits carried in the SFBCH 30 ranges from seven to twenty-four (FIG. 2). The number of bits carried in the SFBCH 30 is adaptive, in some embodiments.

The feedback content to be transmitted by the UFCH method 100 using the SFBCH 30 is described in a table 32 in FIG. 9, according to some embodiments. The SFBCH 30 supports the frequency selective structure (FSS) and MIMO scheme, with localized permutation mode by way of a different feedback format. Sub-band selection, RI and stream indicator (SI) may be reported over a longer period (long-term), while sub-band CQI, sub-band PMI may be reported more frequently (short-term). MIMO information includes sub-band PMI, stream indicator, and rank indicator.

Reporting Mechanism in SFBCH

The SFBCH 30 is dynamically allocated to the mobile station 60 by feedback allocation IE. Event-driven/non-periodic feedback reporting is supported in the SFBCH 30, and the base station 70 will reallocate or de-allocate the SFBCH to the mobile station 60 according to the event-driven indicator being reported from the PFBCH 20 or other control channels.

Narrowband CQI representation

In some embodiments, the UFCR method 100 represents the CQI of a sub-band by one base CQI (the average CQI, or ave_CQI) over M selected sub-bands, plus a differential CQI (given by diff_CQI), using best-M feedback. Two types of differential CQI may be used, one in the frequency domain and the other in the time domain. With frequency domain differential CQI, two bits are used to indicate [−1, 0, 1, 2] levels of spectral efficiency change (offset), as shown in the table 28 (FIG. 8).

Frequency Domain Differential

In the frequency domain, the average CQI (ave_CQI) of the selected best M CQIs of a sub-band is first obtained. Then, the differential CQI (diff_CQI) between the ave_CQI and each of the best M CQIs are measured. The average CQI is an average of the index of spectral efficiency of the M CQIs (floor to the integral number is required), and the differential CQI, diff_CQI, is the offset of the spectral efficiency from the individual CQI to the average CQI.

So, where M=3, there would be three CQI measurements, $CQI_1$, $CQI_2$, and $CQI_3$, of a sub-band. These three measurements are averaged, to obtain ave_CQI. Then, each of the original CQI measurements is subtracted from the average CQI to obtain three differential CQI values, as follows:

$$\text{diff\_}CQI_1 = |CQI_1 - \text{ave\_}CQI|$$

$$\text{diff\_}CQI_2 = |CQI_2 - \text{ave\_}CQI|$$

$$\text{diff\_}CQI_3 = |CQI_3 - \text{ave\_}CQI|$$

The four values, ave_CQI, diff_CQI$_1$, diff_CQI$_2$, and diff_CQI$_3$ are then reported to the base station 70 by the mobile station 60. This is preferred over simply transmitting the three CQI measurements, CQI$_1$, CQI$_2$, and CQI$_3$, of the sub-band because reporting CQI measurements, as explained above, takes four bits each, for a total of twelve bits. Each differential CQI, however, uses only two bits, so reporting ave_CQI, diff_CQI$_1$, diff_CQI$_2$, and diff_CQI$_3$ takes ten bits (4 +2 +2 +2), for a savings of two bits.

Time Domain Differential

The UFCR method 100 obtains the average CQI a little differently in the time domain, in some embodiments. In the time domain, multiple CQI measurements of a sub-band are taken in successive frames. Thus, the CQI of a previous frame (given as pre_CQI) is obtained. Then, the CQI is obtained of the current frame and the next frame. Instead of reporting the whole CQI value for each frame, the differential CQI (diff_CQI) is calculated, using the previous CQI, pre_CQI, as the baseline. Two bits are used to indicate [−2, −1, 0, 1] levels of spectral efficiency change, as shown in the table 28 (FIG. 8). Again, there is a cost savings using the differential CQI information rather than multiple 4-bit CQI measurements.

In some embodiments, the UFCR method 100 determines whether to use frequency domain differential CQI or time domain differential CQI based on how the average CQI is reported. If the average CQI is reported together with the differential CQI, then only the frequency domain differential CQI is used. If the two CQI measurements are reported separately in different time periods, the first differential CQI, reported right after the average CQI, will be a frequency domain differential measurement, while the following differential CQI reporting will be a time domain differential measurement, that is, until the next average CQI reporting takes place.

Narrowband CQI reporting in SFBCH

The channel quality index and rank index combinations in the SFBCH 30 are the same as in the PFBCH 20, as described in the table 24 (FIG. 4). Depending on a maximum rank, payload bits of the CQI and RI joint reporting are variable, in some embodiments. In some embodiments, the UFCR method 100 uses different sub-tables of the table 24 to reduce overhead and improve performance. For example, consider four-bit CQI-RI reporting for a rank of one. If the rank is less than or equal to four, five-bit CQI-RI reporting may be used. If the rank is larger than four, then six-bit CQI-RI reporting is conducted, in some embodiments.

Additionally, narrowband CQI is represented by a base channel quality indicator, base_CQI, and the differential CQI, diff_CQI. The base CQI may be the minimum CQI, the maximum CQI, or the average CQI. The UFCR method 100 provides two ways to report the CQI information, in some embodiments. In the first case, the base CQI is reported via the PFBCH 20 and the differential CQI is reported via the SFBCH 30. In the second case, both the base_CQI and diff_CQI are reported via the SFBCH 30, but the base_CQI may be reported less frequently.

Feedback Format in SFBCH

In some embodiments, the UFCR method 100 reports long-term information (sub-band selection, stream indicator, average CQI, etc.) and short-term information using time division multiplexing within one SFBCH 30. Different feedback formats are provided for different MIMO modes to balance the bits transmitted in different reporting periods. The UFCR method 100 offers four different feedback formats, as described below. FIGS. 10A-10D depict these feedback formats schematically, according to some embodiments.

First Feedback Format

Under a first feedback format, the UFCR method 100 feeds back all information content together in one SFBCH 30, in every reporting period, where the total number of information bits does not exceed twenty-four bits. FIG. 10A shows that the SFBCH 30 is used to report the information content as presented in the table 32 of FIG. 8.

Second Feedback Format

Under a second feedback format, the UFCR method 100 reports sub-band selection information periodically, for example, every four reporting periods. All other content is reported together every reporting period. FIG. 10B shows sub-band selection being reported every four frames. The sub-band selection punctures the CQI and PMI reporting.

Third Feedback Format

Under a third feedback format, the UFCR method 100 reports sub-band selection and average CQI every four reporting periods. All other content is reported together in every reporting period, as shown in FIG. 10C. Sub-band selection and average CQI reporting will puncture other CQI reporting. In FIG. 10C, "type 1 diff" means frequency domain differential and "type 2 diff" means time domain differential.

Fourth Feedback Format

Under a fourth feedback format, the UFCR method 100 reports sub-band selection and stream indicator every four reporting periods. All other content is reported together in every reporting period, as shown in FIG. 10D. Sub-band selection and stream indicator reporting will puncture other CQI reporting.

In some embodiments, multiple secondary fast feedback channels are allocated to feed back the PMI, differential CQI, and SI information, when M is larger, in best-M-based CQI reporting.

The feedback format, together with MIMO feedback mode (or MIMO configuration), may be indicated by downlink signaling when allocating feedback channel resources. The mobile station 60 may know what kinds of content to be fed back, total reporting bits, reporting frequency, and format when using the feedback channels to report.

Feedback Channel Allocation

Depending on the specific MIMO mode, the base station 70 allocates feedback channels differently, in some embodiments. If the mobile station 60 only works in the MIMO scheme with downlink diversity mode, wideband CQI/MIMO reporting are needed and only the PFBCH 20 is allocated.

If the mobile station 60 only works in the MIMO scheme with downlink localized mode, the UFCR method 100 takes one of two actions. In a first case, the base station 70 allocates the SFBCH 30 only (there may be multiple channels, depending on the user's uplink channel quality and number of bits to be fed back) in order to feed back narrowband CQI and narrowband MIMO information. In this case, the base station 70 may allocate one PFBCH 20 to the mobile station 60, with a very low reporting frequency to support event-driven reporting, with other on-demand non-regular information being reported in the user's SFBCH 30. In this case, the reporting in the allocated PFBCH 20 will puncture the SFBCH 30 reporting. In a second case, the base station 70 will allocate the PFBCH 20 only to report CQI/MIMO-related data if the user has pretty poor uplink channel quality.

Additionally, the base station 70 conducts null detection in both the PFBCH 20 and the SFBCH 30 after it allocates either the primary or secondary feedback channel to a mobile station. Thus, the base station 70 may know whether the mobile station 60 has received allocation signaling successfully or not. If not, the base station 70 will consider resending this allocation element.

The uplink feedback channel reporting method 100 thus reports wide-band CQI and MIMO feedback periodically, and reports non-regular information on demand, including event-driven indicators, frequency partition selection, and so on, in the primary feedback channel, and uses a sequence to distinguish the information content. The event-driven reporting mechanism in the SFBCH 30 is based on channel/traffic variation and uses the mobile station 60 to trigger event-driven reports due to channel variation. The UFCR method 100 also performs joint-coded CQI and RI reporting in both the primary 20 and secondary 30 feedback channels to reduce overhead. Different feedback content in the SFBCH 30 may share the same secondary fast feedback channel in reporting under time division multiplexing. The UFCR method 100 performs narrow-band CQI reporting, by reporting both frequency domain and time domain differential CQI, together with a base CQI, over M selected sub-bands. The PFBCH 20 may be always on with a much lower reporting frequency, to support event-driven mechanisms and other non-regular information reporting. This reporting in the PFBCH 20 may puncture the original SFBCH 30 reporting to reduce overhead.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. An uplink feedback channel reporting method, comprising:
   periodically reporting regular information to a base station using a feedback channel, wherein the regular information comprises channel quality indicator (CQI) information, rank indicator information, or both CQI and rank indicator information, the CQI information further comprising:
      wideband CQI comprising an average CQI across an entire frequency band for both closed-loop multiple-input-multiple-output (MIMO) and open-loop MIMO working in downlink diversity mode;
      average CQI comprising a single average CQI measure across selected multiple sub-bands; and
      specified CQI comprising a CQI measurement for a predetermined resource unit;
   the rank indicator comprising the number of streams for all single-user MIMO schemes and the average CQI is reported in a time domain, wherein reporting the average CQI further comprises:
      obtaining the CQI of a previous frame;
      obtaining the CQI of a current frame, wherein the current frame succeeds the previous frame;
      obtaining the CQI of a next frame, wherein the next frame succeeds the current frame;
      calculating a differential CQI between the previous frame and the current frame, and between the current frame and the next frame; and
      reporting the differential CQI to the base station.

2. The uplink feedback channel reporting method of claim 1, periodically reporting regular information to a base station using a feedback channel further comprising:
   simultaneously reporting CQI and rank indicator using the feedback channel, wherein:
      in response to the rank indicator being larger than one, not using repetition coding in a modulation and coding scheme (MCS) of the CQI; and
      for combinations of CQI and rank indicator that have a same spectrum efficiency, either:
         keeping the combination that uses a lower MCS with a higher rank; or
         keeping the combination that uses a higher MCS having a lower rank.

3. The uplink feedback channel reporting method of claim 1, periodically reporting regular information to a base station using a feedback channel further comprising:
   separately reporting the CQI and rank information in the same feedback channel using time division multiplexing, wherein:
      the CQI information is reported in each frame of the feedback channel; and
      the rank information is periodically reported in a frame of the feedback channel, wherein the rank information punctures the CQI information in the frame;
   wherein the rank information is reported less often than the CQI information to the base station.

4. The uplink feedback channel reporting method of claim 1, periodically reporting regular information to the base station using the feedback channel further comprising:
   periodically reporting both rank indicator and channel quality indicator information to the base station using a primary fast feedback channel, wherein the primary fast-feedback channel comprises six bits.

5. The uplink feedback channel reporting method of claim 1, periodically reporting regular information to the base station using the feedback channel further comprising:
   periodically reporting both rank indicator and channel quality indicator information to the base station using a secondary fast feedback channel, wherein the secondary fast-feedback channel comprises between seven bits and twenty-four bits inclusive.

6. The uplink feedback channel reporting method of claim 1, further comprising:
   reporting non-regular information to the base station on-demand using the feedback channel, the non-regular information reporting further comprising:
   reporting based on channel variation, the reporting further comprising:
      in response to a channel not varying by higher than a predetermined threshold for a certain time period, sending a notification to the base station to stop CQI reporting and release an allocation of a secondary fast feedback channel; and
      in response to the channel varying above the predetermined threshold, sending a second notification to the base station to resume CQI reporting and restore the allocation of the secondary fast feedback channel.

7. The uplink feedback channel reporting method of claim 1, further comprising:
   reporting non-regular information to the base station on-demand using the feedback channel the non-regular information reporting further comprising:
   reporting based on traffic variation, the reporting further comprising:
      in response to a channel traffic not varying higher than a predetermined threshold for a certain time period, sending a notification to the base station to stop CQI reporting and release an allocation of a secondary fast feedback channel; and
      in response to the channel traffic varying above the predetermined threshold, sending a second notification to the base station to resume CQI reporting and restore the allocation of the secondary fast feedback channel.

8. The uplink feedback channel reporting method of claim 6, further comprising:
sending the notification by setting a bit in a primary fast feedback channel; or
sending the second notification by clearing the bit in the primary fast feedback channel;
wherein the bit in the primary fast feedback channel indicates whether the secondary fast feedback channel is to be reallocated or released.

9. The uplink feedback channel reporting method of claim 6, further comprising:
sending the notification by setting a bit in a bandwidth request channel; or
sending the second notification by clearing the bit in the bandwidth request channel;
wherein the bit in the bandwidth request channel indicates whether the secondary fast feedback channel is to be reallocated or released.

10. The uplink feedback channel reporting method of claim 6, further comprising:
sending the notification by setting a bit in the secondary fast feedback channel; or
sending the second notification by clearing the bit in the secondary fast feedback channel;
wherein a primary fast feedback channel is not on and the bit in the secondary fast feedback channel indicates whether the secondary fast feedback channel is to be reallocated or released.

11. The uplink feedback channel reporting method of claim 1, further comprising:
reporting the following to the base station on an event-driven basis:
a channel variation event;
a bandwidth request;
a frequency partition selection; and
a buffer management event, wherein the buffer management event indicates an occupancy status of a hybrid automatic repeat request soft buffer.

12. The uplink feedback channel reporting method of claim 1, reporting average CQI further comprising:
obtaining an average CQI of a selected best M CQIs of a sub-band, denoted ave_CQI, for integer M;
measuring a differential CQI between the ave_CQI and each of the selected best M CQIs, denoted $diff\_CQI_1$, $diff\_CQI_2$, ..., $diff\_CQI_M$; and
reporting ave_CQI and $diff\_CQI_1$, $diff CQI_2$, ..., $diff\_CQI_M$ to the base station;
wherein the average CQI is reported in a frequency domain.

13. The uplink feedback channel reporting method of claim 1, further comprising:
reporting narrowband CQI to the base station, wherein the narrowband CQI is represented by a base CQI and a differential CQI, wherein the base CQI is either a minimum CQI, a maximum CQI, or an average CQI.

14. The uplink feedback channel reporting method of claim 13, further comprising:
reporting the base CQI using a primary fast feedback channel; and
reporting the differential CQI using a secondary fast feedback channel.

15. The uplink feedback channel reporting method of claim 13, further comprising:
reporting the base CQI and the differential CQI using a secondary fast feedback channel.

16. An uplink feedback channel reporting method, comprising:
periodically reporting regular information to a base station using a feedback channel, wherein the regular information comprises channel quality indicator (CQI) information, rank indicator information, or both CQI and rank indicator information; and
reporting non-regular information to the base station on-demand using the feedback channel, wherein the non-regular information punctures the regular information reporting;
using a secondary fast feedback channel to report the following:
sub-band CQI comprising an average CQI and a differential CQI of selected sub-bands;
sub-band selection, comprising a selected sub-band position, index, or bitmap;
sub-band pre-coding matrix index (PMI), comprising a PMI of one sub-band for a closed-loop multiple-input-multiple-output (MIMO) scenario;
a stream indicator for open-loop multi-user MIMO; and
a rank indicator, wherein the rank indicator is a number of streams.

17. The uplink feedback channel reporting method of claim 16, further comprising:
reporting the sub-band CQI, sub-band selection, sub-band PMI, stream indicator, and rank indicator in every frame, wherein the total number of bits in the secondary fast feedback channel does not exceed twenty-four bits.

18. The uplink feedback channel reporting method of claim 16, further comprising:
reporting the sub-band CQI, sub-band PMI, stream indicator, and rank indicator in every frame; and
reporting the sub-band selection information periodically.

19. The uplink feedback channel reporting method of claim 16, further comprising:
reporting the sub-band PMI, stream indicator, and rank indicator in every frame; and
reporting the sub-band selection and sub-band CQI information every four frames.

20. The uplink feedback channel reporting method of claim 16, further comprising:
reporting the sub-band CQI, sub-band PMI, and rank indicator in every frame; and
reporting the sub-band selection and stream indicator information every four frames.

* * * * *

UNITED STATES PATENT AND TRADEMARK OFFICE
CERTIFICATE OF CORRECTION

PATENT NO. : 8,417,190 B2  
APPLICATION NO. : 12/646962  
DATED : April 9, 2013  
INVENTOR(S) : Hongmei Sun et al.

Page 1 of 1

It is certified that error appears in the above-identified patent and that said Letters Patent is hereby corrected as shown below:

In the Drawings:

On sheet 8 of 12, in Figure 8, line 15, delete "oveflow" and insert -- overflow --, therefor.

On sheet 9 of 12, in Figure 8, line 10, delete "variaton" and insert -- variation --, therefor.

Signed and Sealed this  
Eleventh Day of June, 2013

Teresa Stanek Rea  
*Acting Director of the United States Patent and Trademark Office*